United States Patent
Vuorinen et al.

(10) Patent No.: US 9,980,190 B2
(45) Date of Patent: May 22, 2018

(54) ACTIVE SET UPDATE (ASU) WITH HIGH SPEED DOWNLINK SHARED CHANNEL (HS-DSCH) INFORMATION

(75) Inventors: Petri Vuorinen, Espoo (FI); Jukka Nauha, Oulu (FI); Juho Pirskanen, Tampere (FI)

(73) Assignee: Conversant Wireless Licensing S.a.r.l., Luxembourg (LU)

( * ) Notice: Subject to any disclaimer, the term of this patent is extended or adjusted under 35 U.S.C. 154(b) by 416 days.

(21) Appl. No.: 11/237,643

(22) Filed: Sep. 27, 2005

(65) Prior Publication Data

US 2006/0089142 A1  Apr. 27, 2006

Related U.S. Application Data

(60) Provisional application No. 60/614,562, filed on Sep. 29, 2004.

(51) Int. Cl.
- *H04W 36/18* (2009.01)
- *H04W 36/00* (2009.01)
- *H04W 36/08* (2009.01)
- *H04W 88/12* (2009.01)

(52) U.S. Cl.
CPC ....... *H04W 36/18* (2013.01); *H04W 36/0055* (2013.01); *H04W 36/08* (2013.01); *H04W 88/12* (2013.01)

(58) Field of Classification Search
USPC ......... 455/525, 436, 522, 439, 423, 69, 424; 370/342, 352, 401, 325, 331
See application file for complete search history.

(56) References Cited

U.S. PATENT DOCUMENTS

| | | | |
|---|---|---|---|
| 6,449,290 B1 * | 9/2002 | Willars | H04B 7/2668 370/324 |
| 6,590,879 B1 | 7/2003 | Huang et al. | 370/331 |
| 7,054,633 B2 * | 5/2006 | Seo et al. | 455/439 |
| 7,239,420 B2 * | 7/2007 | Goggins | H04N 1/00201 358/1.2 |

(Continued)

FOREIGN PATENT DOCUMENTS

| | | |
|---|---|---|
| CN | 1421108 A | 5/2003 |
| EP | 1 377 101 A1 | 1/2004 |

(Continued)

OTHER PUBLICATIONS

Including HS-DSCH serving cell change in ASU, #GPP TSG-RAN WG2 Meeting #46bis Beijing China Apr. 4-8, 2005, R2-051203.

(Continued)

*Primary Examiner* — Steven Kelley
(74) *Attorney, Agent, or Firm* — Conversant Wireless Licensing

(57) ABSTRACT

Because the current RRC: ACTIVE SET UPDATE message presently used in soft handover does not contain HS-DSCH related information, which could be utilized for a Serving HS-DSCH cell change, a separate Radio Bearer Control procedure is needed between the UE (10) and the RNC (20) for carrying out the Serving HS-DSCH cell change. Should HS-DSCH related information—applicable to Serving HS-DSCH cell change—be added to the RRC: ACTIVE SET UPDATE message (32), an unnecessary Radio Bearer Control procedure is avoided, and the drawbacks of the current method are overcome.

11 Claims, 7 Drawing Sheets

(56) References Cited

U.S. PATENT DOCUMENTS

| | | | | |
|---|---|---|---|---|
| 7,245,919 | B2* | 7/2007 | Lau | H04W 36/30 455/433 |
| 2002/0173329 | A1* | 11/2002 | Hwang | H04W 36/18 455/522 |
| 2003/0031119 | A1* | 2/2003 | Kim et al. | 370/200 |
| 2003/0147370 | A1* | 8/2003 | Wu | H04L 1/187 370/338 |
| 2004/0038681 | A1* | 2/2004 | Chun | H04L 1/188 455/436 |
| 2004/0165554 | A1 | 8/2004 | Chao et al. | |
| 2004/0242260 | A1* | 12/2004 | Lescuyer | 455/525 |
| 2005/0207374 | A1 | 9/2005 | Petrovic et al. | |
| 2005/0281222 | A1* | 12/2005 | Ranta-Aho | H04W 76/046 370/328 |

FOREIGN PATENT DOCUMENTS

| | | |
|---|---|---|
| EP | 1 432 262 | 6/2004 |
| EP | 1377101 B1 | 9/2006 |
| WO | WO 2004064342 A1 | 7/2004 |

OTHER PUBLICATIONS

"3$^{rd}$ Generation Partnership Project; Technical Specification Group Radio Access Network; Radio Interface Protocol Architecture (Release 6)"; 3GPP TS 25.301 V6.0.0; Dec. 2003; p. 30; 3$^{rd}$ Generation Partnership Project.

"3$^{rd}$ Generation Partnership Project; Technical Specification Group Radio Access Network; High Speed Downlink Packet Access (HSDPA); Overall description; Stage 2 (Release 6)"; 3GPP TS 25.308 V6.1.0; Mar. 2004; pp. 21-26; 3$^{rd}$ Generation Partnership Project.

"3$^{rd}$ Generation Partnership Project; Technical Specification Group Radio Access Network; Radio Resource Control (RRC); Protocol Specification (Release 6)"; 3GPP TS 25.331 V6.2.0; Jun. 2004; pp. 32-34, 37, 180-184, 341-342, 442, 489, 514-516, 525-526, 927-951; 3$^{rd}$ Generation Partnership Project.

"3$^{rd}$ Generation Partnership Project; Technical Specification Group Radio Access Network; UTRAN Iub interface; general aspects and principles (Release 6)"; 3GPP TS 25.430 V6.1.0; Jun. 2004; p. 22; 3$^{rd}$ Generation Partnership Project.

"3$^{rd}$ Generation Partnership Project; Technical Specification Group Radio Access Network; Radio resource management strategies (Release 6)"; 3GPP TS 25.922 V6.0.1; Apr. 2004; whole document; 3$^{rd}$ Generation Partnership Project.

European Patent Office Extended European Search Report dated Jun. 8, 2011.

"HS-DSCH mobility definitions", Document R2-012329, 3GPP TSG-RAN WG2 meeting #24 (Ericsson, 2001).

"Updates of RRC procedures and parameters for support of HS-DSCH", Document R2-020085, 3GPP TSG-RAN WG2 #26 (Ericsson, 2002).

"Mobility examples when the UE has an HS-PDSCH assignment", Document R2-020088, 3GPP TSG-RAN WG2 #26 (Ericsson, 2002).

"Draft changes to RRC to support HSDPA", Document R2-020126, 3GPP TSG-RAN WG2 meeting #26 (Motorola, 2002).

"Removal of the DCCH mapping on HS-DSCH: CRs on 25.301, 25.308 and 25-331 (Rel-5, Rel-6)", Document RP-040369 (includes Documents R2-041884, R2-041882, and R2-041912), 3GPP TSG-RAN Meeting #25 (Nokia, 2004).

"SRBs mapping on HS-DSCH", Document R2-041525, 3GPP TSG-RAN2 Meeting #42 (Nortel Networks, Aug. 2004).

* cited by examiner

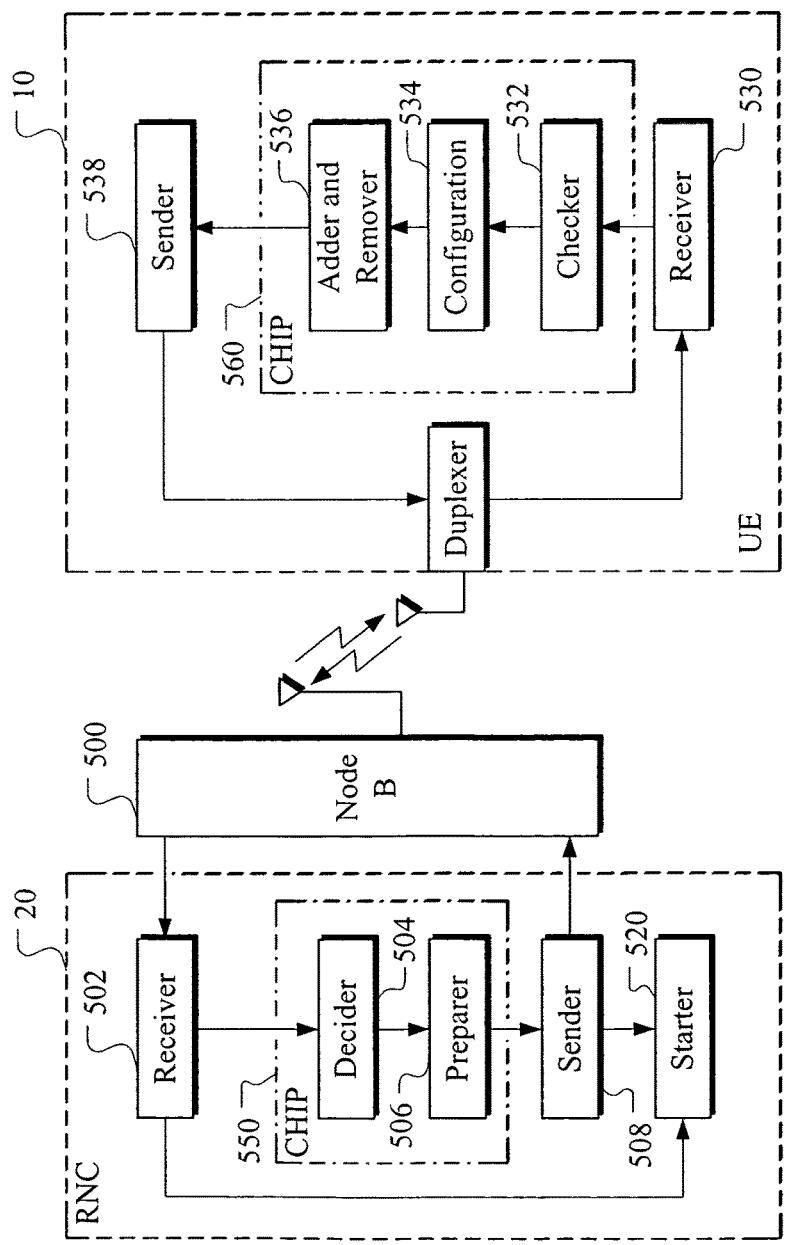

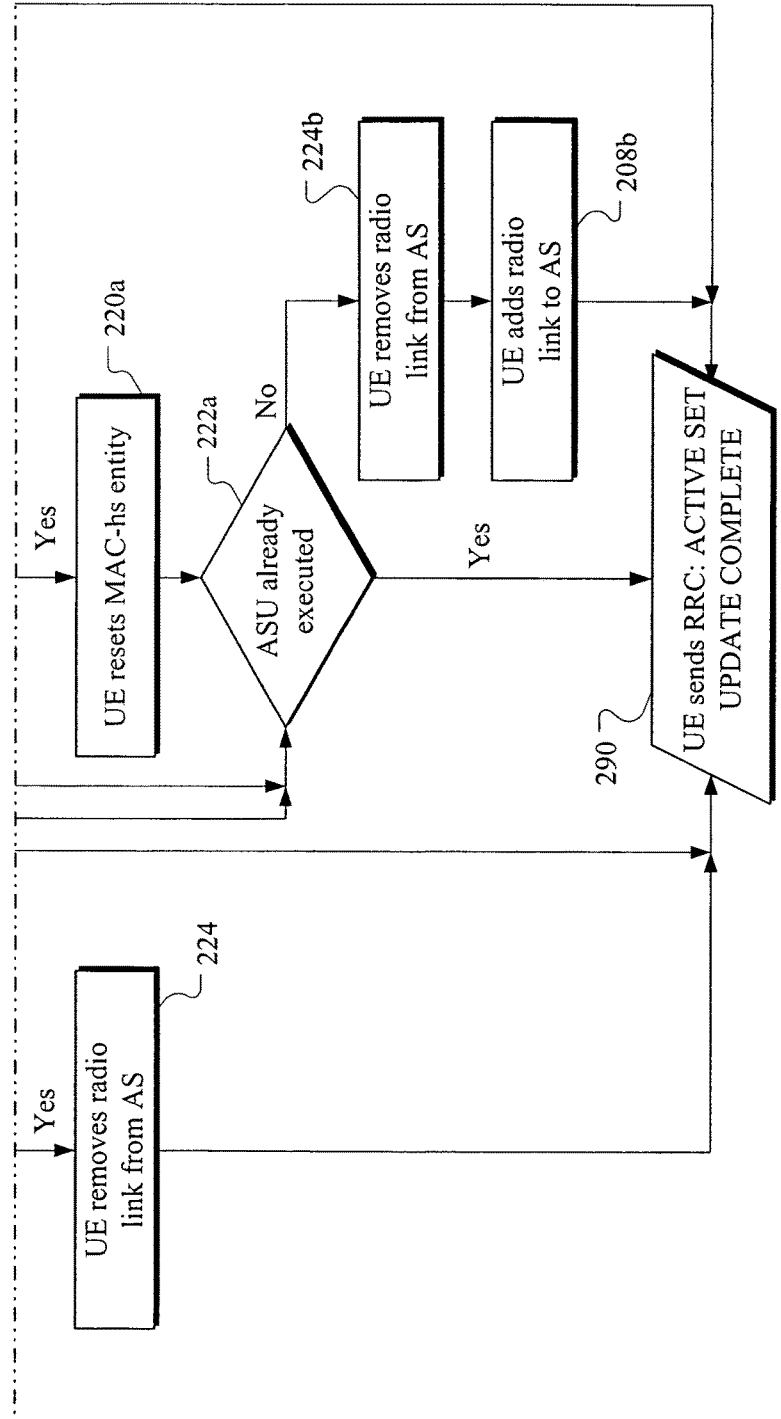

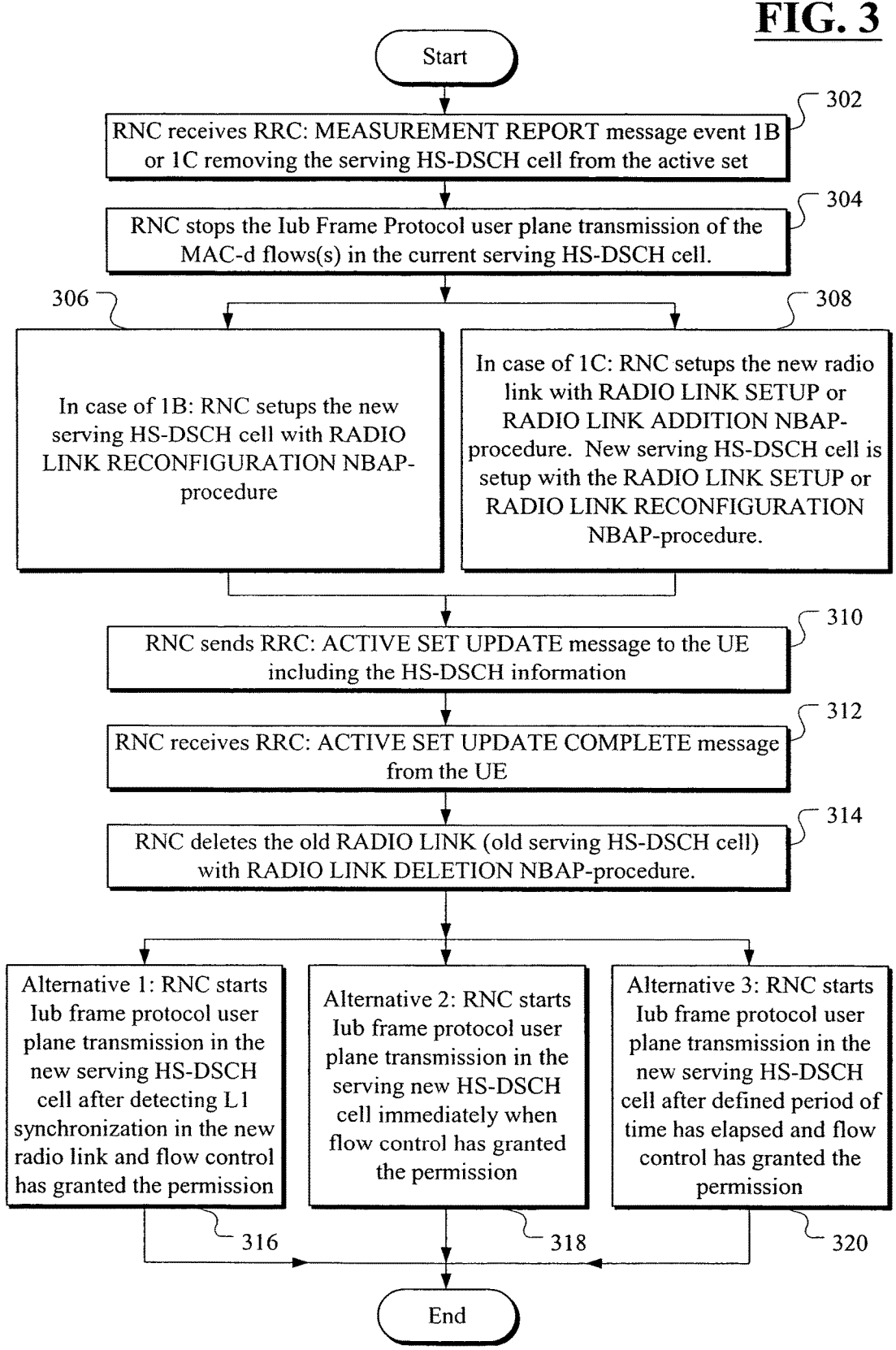

ACTIVE SET UPDATE (ASU) WITH HIGH SPEED DOWNLINK SHARED CHANNEL (HS-DSCH) INFORMATION

CROSS-REFERENCE TO RELATED APPLICATION

This application claims priority from U.S. Provisional Application Ser. No. 60/614,562 filed Sep. 29, 2004.

BACKGROUND OF THE INVENTION

1. Technical Field

The present invention relates to handover mechanisms for mobile radio devices and, more particularly, to simplifying signaling used to carry out a change in a serving High Speed Downlink Shared Channel (HS-DSCH) cell change.

2. Discussion of Related Art

The Third Generation Partnership Project (3GPP) Release 5 (Rel5) introduced a new HS-DSCH transport channel.

From the 3GPP Release 6 Technical Specification TS 25.308 v6.1.0 (2004-03), it is set forth in Chapter 9 that mobile evaluated handover mechanisms provide the Radio Resource Control (RRC) connection mobility in a CELL_DCH state (see 3GPP TS 25.331 v6.2.0 (2004-06) Chapter 7.1 for an overview of the RRC states and state transitions including GSM). The mobility procedures are affected by the fact that the High Speed Physical downlink shared channel (HS-PDSCH) allocation for a given user equipment (UE) belongs to only one of the radio links assigned to the UE, the serving HS-DSCH radio link. The cell associated with the serving HS-DSCH radio link is defined as the serving HS-DSCH cell.

When conditions for an Active Set Update (ASU) (see 3GPP TS 25.331 v6.2.0 (2004-06) Release 6, Chapter 8.3.4 Active Set Update) and Serving HS-DSCH cell change (see 3GPP TS 25.308 v6.1.0 (2004-03) Release 6, Chapter 9, Mobility Procedures) become simultaneously effective, i.e. when the serving HS-DSCH cell operation is to be moved to the other active set cell and active set of the UE is to be modified (adding new cell (1A), or replacing existing cell with new one (1B), RRC procedures involved (Active Set Update (ASU) and Radio Bearer Control) must be performed separately, one after the other. Depending on scenario either the ASU or Radio Bearer Control procedure is performed first. If the ASU is performed first, the Radio Bearer Control Procedure is delayed introducing performance degeneration to HS-DSCH transmission, which can critical for maintaining the connection, especially when SRBs are mapped on HS-DSCH (required when introducing Fractional DPCH). In other scenario, the Radio Bearer Control procedure containing the necessary HS-DSCH information is needed to be performed first followed by ASU, due to fact that current serving HS-DSCH cell needs to be removed from the UEs AS before RNC is able to add new cell to the AS. This introduces a rather long delay for the ASU, potentially risking the connection. In some cases this delay could not be tolerated and ASU has to be performed first causing a rather long break in HS-DSCH transmission instead.

DISCLOSURE OF INVENTION

According to a first aspect of the present invention, a method for execution in a radio network controller comprises receiving at the radio network controller a measurement report from a user equipment, making a decision at the radio network controller to make a serving high-speed downlink shared channel cell change and to make an active set update, preparing a radio link at a new cell to operate as a serving high-speed downlink shared channel radio link, sending an active set update message from the radio network controller to the user equipment, said active set update message including information about the high-speed downlink shared channel cell change, receiving at the radio network controller an active set update complete message from the user equipment, and starting a frame protocol in the radio link of the new cell. A computer program may be provided stored on a computer readable medium for execution of the foregoing steps.

According to a second aspect of the present invention, a method for execution in user equipment comprises receiving an active set update message from a radio network controller with a radio link addition or removal to or from the active set, or both, checking the active set update message for information about a serving high-speed downlink shared channel cell change, configuring the user equipment to operate with a new serving high-speed downlink shared channel cell, adding or removing, or both, a radio link to or from, or both, an active set, and sending an active set update complete message from the user equipment to the radio network controller. A computer program stored may be provided on a computer readable medium for execution of the foregoing steps.

According to a third aspect of the present invention, a system having a plurality of interconnected radio network controllers, each radio network controller comprises a receiver for receiving at the radio network controller a measurement report from a user equipment; a decider for making a decision at the radio network controller to make a serving high-speed downlink shared channel cell change and to make an active set update; a preparer for preparing a radio link at a new cell to operate as a serving high-speed downlink shared channel radio link; a sender for sending an active set update message from the radio network controller to the user equipment, said active set update message including information about the high-speed downlink shared channel cell change; the receiver for also receiving an active set update complete message from the user equipment; and a starter for starting a frame protocol in the radio link of the new cell.

The system according to the third aspect of the invention may further comprise plural user equipment, each user equipment comprising a receiver for receiving said active set update message from said radio network controller with a radio link addition or removal to or from the active set, or both, a checker for checking the active set update message for information about a serving high-speed downlink shared channel cell change, a configurer for configuring the user equipment to operate with a new serving high-speed downlink shared channel cell, an adder and remover module for adding or removing, or both, a radio link to or from, or both, an active set, and a sender for sending an active set update complete message from the user equipment to the radio network controller.

According to a fourth aspect of the present invention, a radio network controller, comprises a receiver for receiving at the radio network controller a measurement report from a user equipment; a decider for making a decision at the radio network controller to make a serving high-speed downlink shared channel cell change and to make an active set update; a preparer for preparing a radio link at a new cell to operate as a serving high-speed downlink shared channel radio link; a sender for sending an active set update message from the radio network controller to the user equipment, said active set update message including information about the high-speed downlink shared channel cell change; said receiver for receiving at the radio network controller an active set update complete message from the user equipment; and a starter for starting a frame protocol in the radio link of the new cell.

According to a fifth aspect of the present invention, user equipment comprises a receiver for receiving an active set update message from a radio network controller with a radio link addition or removal to or from the active set, or both; a checker for checking the active set update message for information about a serving high-speed downlink shared channel cell change; a configuration module for configuring the user equipment to operate with a new serving high-speed downlink shared channel cell; an adder and remover module for adding or removing, or both, a radio link to or from, or both, an active set; and a sender for sending an active set update complete message from the user equipment to the radio network controller.

According to a sixth aspect of the present invention, a data structure is provided for at least temporary storage in a computer readable medium for use in communicating information relating to a serving high-speed dedicated shared channel cell change in an active set update message over a radio interface between a network element and user equipment.

According to a seventh aspect of the present invention, a method for execution in network element of a radio communications system comprises deciding to make a serving high-speed dedicated shared channel cell change for user equipment, and communicating information relating to said serving high-speed dedicated shared channel cell change in an active set update message over a radio interface between a network element and said user equipment of said radio communication system.

According to an eighth aspect of the present invention, a network element comprises means for deciding to make a serving high-speed dedicated shared channel cell change for user equipment and means for communicating information relating to said serving high-speed dedicated shared channel cell change in an active set update message over a radio interface between said network element and said user equipment.

According to a ninth aspect of the present invention, a method for execution in user equipment comprises receiving an active set update message having information relating to a serving high-speed dedicated shared channel cell change, and checking said active set update message for said information for configuring said user equipment to operate with a new high-speed shared channel cell.

According to a tenth aspect of the present invention, user equipment comprises means for receiving an active set update message having information relating to a serving high-speed dedicated shared channel cell change, means for carrying out an active set update in the user equipment in response to the active set update message, and means for sending an active set update complete message.

According to an eleventh aspect of the present invention, a method comprises communicating information relating to a serving high-speed dedicated shared channel cell change in an active set update message over a radio interface from a network element to user equipment, and communicating information concerning completion of said cell change from said user equipment to said network element over said radio interface.

According to a twelfth aspect of the present invention, a system comprises means for communicating information relating to a serving high-speed dedicated shared channel cell change in an active set update message over a radio interface from a network element to user equipment, and means for communicating information concerning completion of said cell change from said user equipment to said network element over said radio interface.

According to a thirteenth aspect of the present invention, a device for use in user equipment comprises means for checking an active set update message for information concerning a serving high-speed dedicated shared channel cell change and means for adding a cell, removing a cell, or both, from an active set used by said user equipment. The device according to the thirteenth aspect of the invention may further comprise means for configuring said user equipment to operate with another serving high-speed dedicated shared channel cell.

According to a fourteenth aspect of the present invention, a device for use in a network element comprises means for deciding to make a serving high-speed dedicated shared channel cell change; and means for preparing a cell to operate as said serving high-speed dedicated shared channel cell.

Because the RRC: ACTIVE SET UPDATE message does not contain HS-DSCH related information, which could be utilized for a Serving HS-DSCH cell change, a separate Radio Bearer Control procedure is needed between the UE and the RNC for carrying out the Serving HS-DSCH cell change. Should HS-DSCH related information—applicable to Serving HS-DSCH cell change—be added to the RRC: ACTIVE SET UPDATE message, an unnecessary Radio Bearer Control procedure could be avoided, and the drawbacks of the current method are overcome.

The described functionality will improve the Serving HS-DSCH cell change procedure by modifying the existing Active Set Update (ASU) procedure to support it. Therefore, signaling of the separate procedure regarding a Serving HS-DSCH cell change is avoided and a faster procedure is achieved.

Pros (+) and cons(−) of different implementation alternatives are listed below:
+ Faster ASU, there is no need to perform Serving HS-DSCH cell change before ASU;
+ Less messages to be transferred; and
+ Smaller transmission break in Serving HS-DSCH cell change or break fully avoided; but
− Longer ASU message These and other objects, features and advantages of the present invention will become more apparent in light of the detailed description of a best mode embodiment thereof, as illustrated in the accompanying drawing.

BRIEF DESCRIPTION OF THE DRAWINGS

FIG. 3 shows the functionality in RNC in case of a 1B or 1C event, which removes the serving HS-DSCH cell from the active set, according to the present invention.

FIG. 5 shows a system comprising plural RNCs with an associated Node B and plural UEs, only one of each type being illustrated, according to the present invention.

BEST MODE FOR CARRYING OUT THE INVENTION

Figure 1:
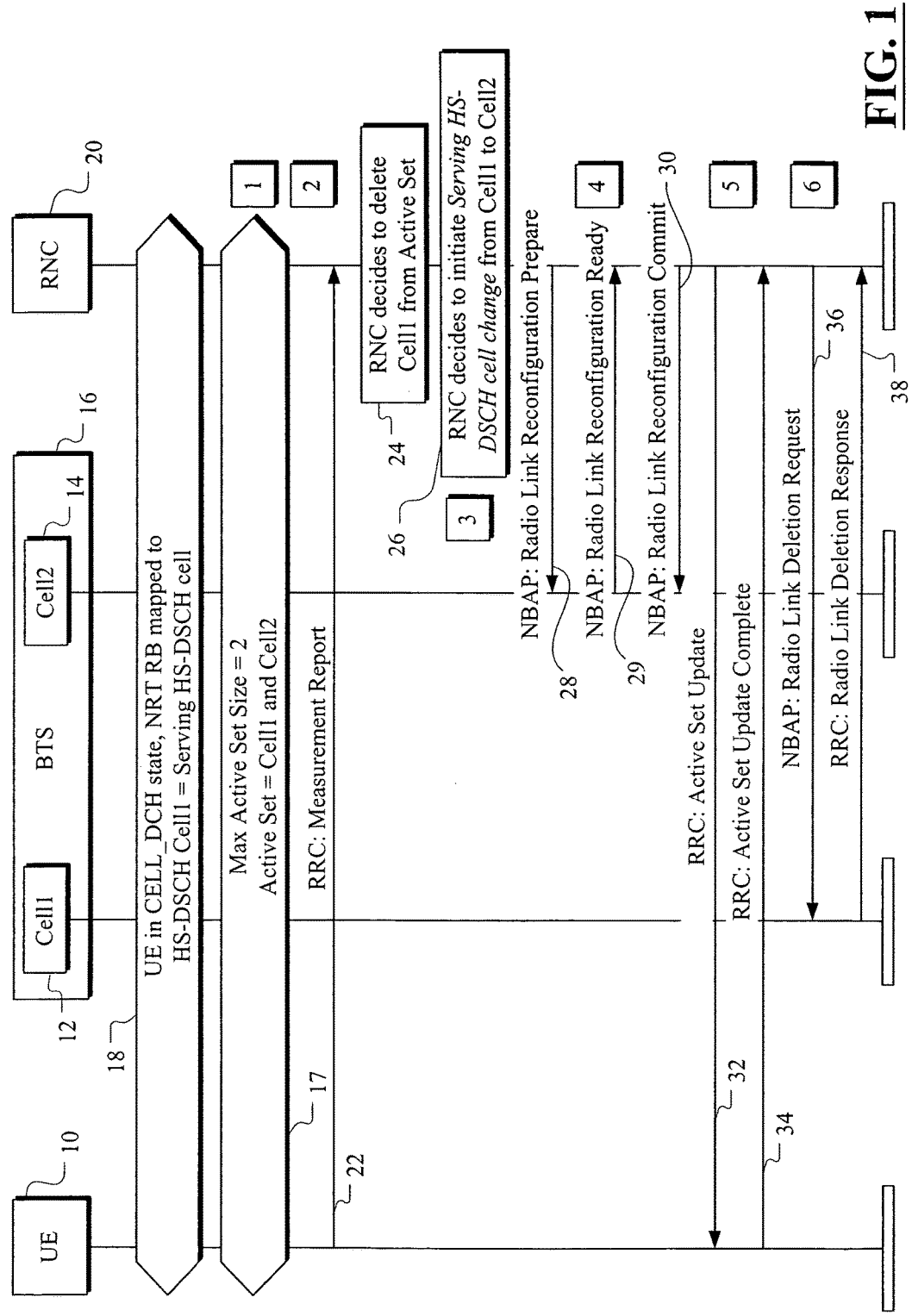
FIG. 1 shows a message sequence regarding a combined Active Set Update and Intra-NodeB serving HS-DSCH cell change, according to the present invention.

List of Abbreviations (see 3GPP TR 21.905 for a comprehensive list)

| | |
|---|---|
| 3GPP | 3$^{rd}$ Generation Partnership Project |
| Active Set | Set of radio links simultaneously involved in a specific communication service between a UE and a UTRAN access point |
| ASU | Active Set Update |
| CPICH | Common Pilot Channel |
| H-RNTI | HS-DSCH Radio Network Temporary Identifier |
| HSDPA | High Speed Downlink Packet Access |
| HS-DSCH | High Speed Downlink Shared Channel |
| HS-PDSCH | High Speed Physical Downlink Shared Channel |
| HS-SCCH | High Speed Shared Control Channel |
| Iu | Interconnection point between an RNC or a BSC and a 3GPP core Network |
| Iub | Interface between an RNC and a Node B |
| Iur | A logical interface between two RNCs |
| MAC-hs | High Speed Medium Access Control |
| NBAP | Node-B Application Part |
| Node B | A logical node responsible for radio transmission/reception in one or more cells to/from the User Equipment. Terminates the Iub interface towards the RNC. |
| RB | Radio Bearer |
| RNC | Radio Network Controller |
| RNTI | Radio Network Temporary Identity |
| RRC | Radio Resource Control |
| UE | User Equipment |
| UTRAN | Universal Terrestrial Radio Access Network |

As suggested above, 3GPP specifies Active Set Update being independent from Serving HS-DSCH cell change, i.e. HS-DSCH information is not transferred with Active Set Update but with a separate Radio Bearer Control procedure. Should the condition for the Active Set Update become effective simultaneously with the Serving HS-DSCH cell change, two separate RRC-procedures must be performed according to the prior art: Active Set Update procedure and Radio Bearer Control procedure. The applicable Radio Bearer Control procedure is either Radio Bearer Reconfiguration, Transport Channel Reconfiguration or Physical Channel Reconfiguration.

According to the present invention, should the combined Active Set Update and Serving HS-DSCH cell change be needed, HS-DSCH information will be transferred with the RRC: ACTIVE SET UPDATE message. Therefore, a separate Radio Bearer Control procedure is not needed, i.e the sending of an RRC: (a) RADIO BEARER RECONFIGURATION message, (b) TRANSPORT CHANNEL RECONFIGURATION message, or (c) PHYSICAL CHANNEL RECONFIGURATION message from the RNC to the UE and corresponding response message RRC: (a) RADIO BEARER RECONFIGURATION COMPLETE, (b) TRANSPORT CHANNEL RECONFIGURATION COMPLETE, or (c) PHYSICAL CHANNEL RECONFIGURATION is avoided.

A typical use case would be the UE sending an RRC: MEASUREMENT REPORT message to the Radio Network Controller (RNC) containing an intra-frequency reporting event 1B: A primary CPICH leaves the reporting range or 1C: A non-active primary CPICH becomes better than an active primary CPICH (for a detailed description of these events see the reference in the paragraph immediately following below). These reporting events will initiate the Active Set Update procedure and also a Serving HS-DSCH cell change when the radio link in question is the serving HS-DSCH radio link. In these cases, if the RRC: ACTIVE SET UPDATE message contained HS-DSCH information, a separate Radio Bearer Control procedure would not be needed. This will be seen as a faster procedure since the sending of two separate RRC-messages between the UE and the RNC is avoided. According to the invention, a combined Active Set Update and Serving HS-DSCH cell change procedure may also be made applicable when the cell is to be added to the active set, that is, when the UE sends reporting event 1A: A primary CPICH enters the reporting range.

Reference is made to Chapter 14 (Specific functions) of 3GPP TS 25.331 v6.2.0 (2004-06) (Rel6), particularly Chapter 14.1 (Intra-frequency measurements), where Reporting event 1A (A primary CPICH (common pilot channel) enters the reporting range) is described in Chapter 14.1.2.1, Reporting event 1B (A primary CPICH leaves the reporting range) is described in Chapter 14.1.2.2, and Reporting event 1C (A non-active primary CPICH becomes better than an active primary CPICH) is described in Chapter 14.1.2.3.

According further to the present invention, the following existing information elements will be added to the RRC: ACTIVE SET UPDATE message (see TS 25.331 v6.2.0 (2004-06) (Release 6) Chapter 10.2.1 ACTIVE SET UPDATE) as optional information elements (IEs):

1. MAC-hs reset indicator (TS 25.331 10.3.6.24)
2. Serving HS-DSCH radio link indicator (TS 25.331 10.3.6.27)
3. HS-SCCH info (TS 25.331 10.3.6.36a)
4. New H-RNTI (TS 25.331 10.3.3.14a)
5. HARQ info (TS 25.331 10.3.5.7a).

Assuming the High Speed Shared Control Channel (HS-SCCH) and Hybrid automatic-repeat-request (HARD) configuration are in most cases not cell specific information in the UTRAN, typically only the above IEs 1, 2 and 4 need to be included in the RRC: ACTIVE SET UPDATE message performing the Serving HS-DSCH cell change.

When the RNC decides to delete a cell—which is also the current serving HS-DSCH cell—from the active set and initiate the Active Set Update procedure, the UE performs an Active Set Update and Serving HS-DSCH cell change with the one procedure, according to the present invention.

Accordingly, the RNC sends an RRC: ACTIVE SET UPDATE message to the UE and the UE responds after a successful procedure with an RRC: ACTIVE SET UPDATE COMPLETE message. The UE will, in addition to the ASU, also update HS-DSCH information of the new cell and perform a Serving HS-DSCH cell change. The invention is applicable both to intra-NodeB and inter-NodeB cases (see TS 25.308 v6.1.0 (2004-03) (Release 6) Chapter 9.1 Mobility Procedures).

FIG. 1 describes a message sequence with the combined ASU and Serving HS-DSCH cell change procedure with the numerals on the square blocks 1-6 to the right side of FIG. 1 corresponding to the numbered paragraphs below. The example concerns Intra-NodeB serving HS-DSCH cell change but is not limited thereto.

1) UE 10 has an active set including two cells 12, 14 under BTS 16: Cell1 12 and Cell2 14. The maximum size of the active set is 2 (see reference numeral 17). As indicated at reference numeral 18, UE 10 is in CELL_DCH state having one PS NRT radio bearer mapped onto the HS-DSCH transport channel. Cell1 12 is currently the serving HS-DSCH cell.

2) UE sends to the RRC in RNC 20: MEASUREMENT REPORT on a line 22 regarding reporting event 1B: A primary CPICH leaves the reporting range regarding Cell1 12.

3) RNC 20 decides 24 to delete Cell1 12 from the active set and to perform 26 a change of the serving HS-DSCH cell from Cell1 to Cell2.

4) RNC prepares a radio link at Cell2 14 to operate as a serving HS-DSCH radio link by exchanging the signals shown on lines 28, 29 and 30. A synchronized procedure is applied.

5) RNC sends RRC: ACTIVE SET UPDATE message on a line 32 to UE 10. Unlike the prior art, the message contains HS-DSCH related information: Serving HS-DSCH radio link indicator and New H-RNTI. UE deletes Cell1 from the active set, performs Serving HS-DSCH cell change and acknowledges successful procedure with RRC: ACTIVE SET UPDATE COMPLETE message on a line 34.

6) RNC 20 sends a request on a line 36 to delete radio link at Cell1 and Cell1 12 then acknowledges a successful deletion procedure by a signal on a line 38 back to the RNC.

Figure 2A:
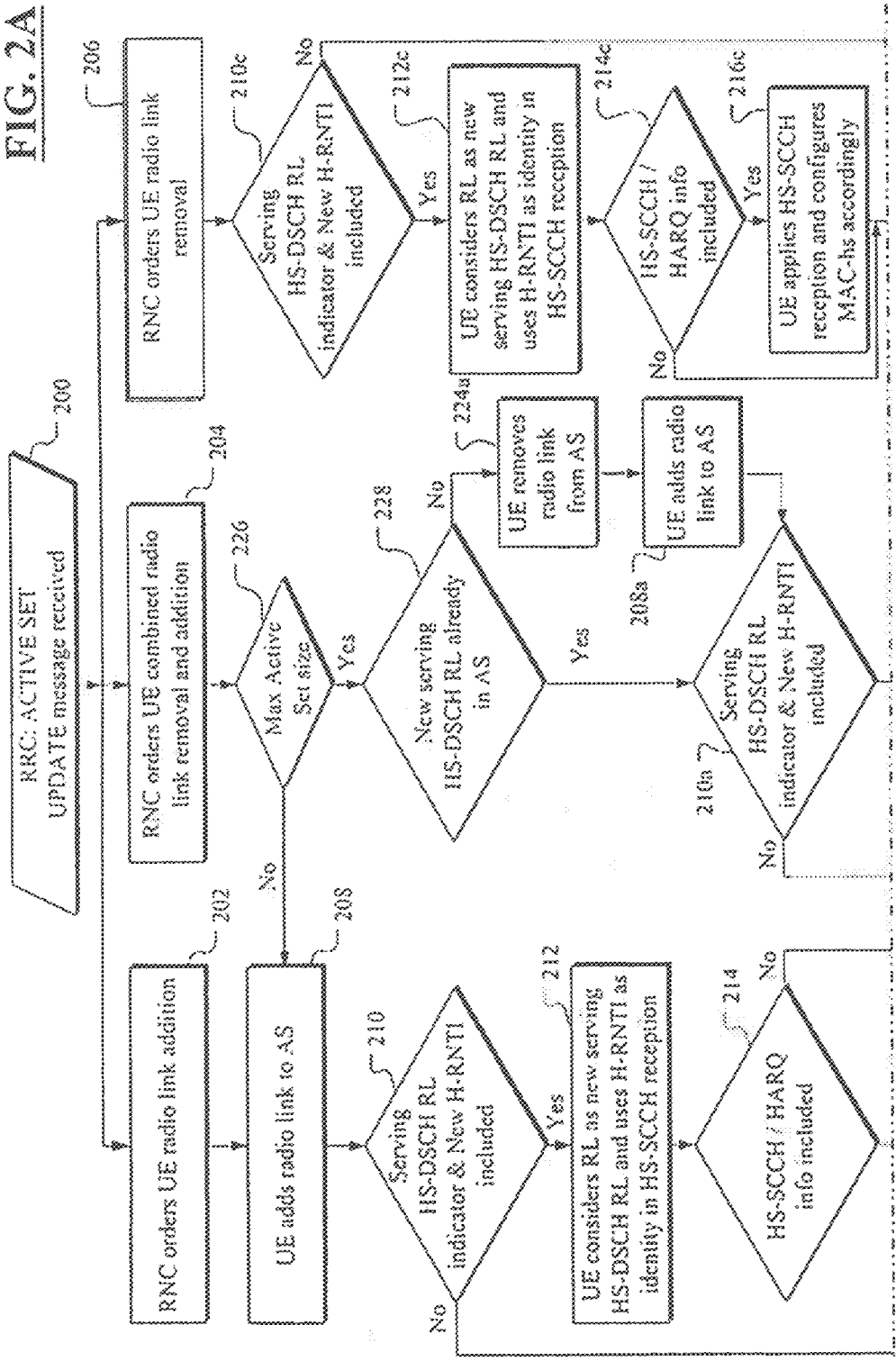
FIG. 2 shows how FIGS. 2A, 2B, and 2C fit together to altogether show a combined Active Set Update (ASU) and Serving HS-DSCH cell change procedure from the point-of-view of the UE, according to the present invention.
Figure 2B:
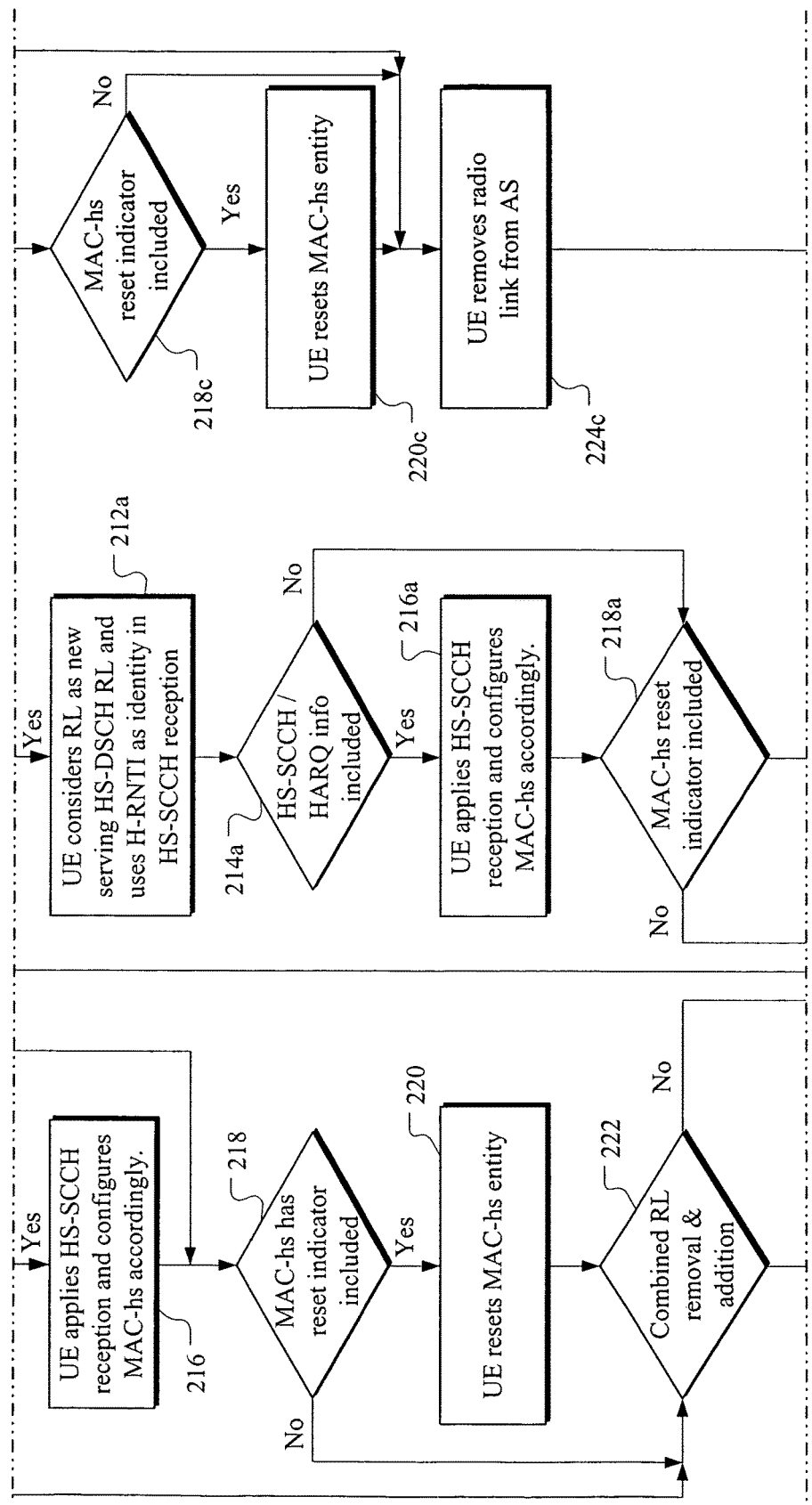

FIG. 2 shows a combined Active Set Update and Serving HS-DSCH cell change procedure, according to the present invention, from the point of view of the UE. The procedure is carried out by the functional blocks in the UE responsible for RRC signalling. Illustrations of these functional entities can be found for example for both the UE and RRC at TS 25.331 (Release 6) v6.2.0: Chapter 4.2. RRC layer model, FIG. 4.2-1: UE side model of RRC; TS 25.301 (Release 6) v6.0.0: Chapter 5.5., Interactions between RRC and lower layers in the C plane, FIG. 10: Interactions between RRC and lower layers.

The procedure illustrated in FIG. 2 is applicable both to intra-NodeB and inter-NodeB cases. Radio links may be under control of either a Serving RNC or a Drift RNC.

1. An HS-DSCH transport channel is allocated to the UE. The RNC decides to execute a combined Active Set Update and Serving HS-DSCH cell change procedure and sends RRC: ACTIVE SET UPDATE message to the UE as shown in a step 200. This corresponds to the UE 10 of FIG. 1 receiving the ASU signal on the line 32.

2. An Active Set Update procedure is initiated when the RNC orders a UE in CELL_DCH state to make one of the following modifications to the active set of the connection: Radio link addition 202, Radio link removal 206 or Combined radio link addition and removal 204. These steps 202, 204, 206 can be understood as the UE 10 deciding exactly which type of order has been made by the RNC 20.

3. In the case where the UE decides the RNC has ordered a Radio link addition as shown in a step 202, the UE first adds a radio link to the active set in a step 208. Then the UE proceeds to the Serving HS-DSCH cell change procedure as follows:
   i. In a decision step 210, the UE checks the Serving HS-DSCH radio link indicator IE and New H-RNTI IE. If they are included, the Serving HS-DSCH cell change procedure is executed. As illustrated by a step 212, the UE considers the radio link (RL), determined by the Serving HS-DSCH radio link indicator, as the serving HS-DSCH radio link. As also shown in the step 212, the UE uses the value of the New H-RNTI as the UE identity in the HS-SCCH reception procedure in the physical layer.
   ii. If HS-SCCH info IE and HARQ info IE are included, as determined in a decision step 214, the UE receives the HS-SCCH(s) according to the HS-SCCH channelization code IE on the serving HS-DSCH radio link applying the scrambling code as received in the DL Scrambling code EE. UE also configures the MAC-hs entity with the number of HARQ processes indicated in Number of Processes IE and assigns to each of these HARQ processes ID as indicated in a step 216.
   iii. If the MAC-hs reset indicator IE is included, as determined in a decision step 218, the UE resets the MAC-hs entity as shown in a step 220. A decision step 222 is next executed to determine if the addition is a combined RL removal and addition (see section 4 below for the reason for this).

4. In the case where the RNC has ordered "Combined" Radio link addition and removal, as shown being determined by the UE in the step 204, the UE first checks the size of the current active set as shown in a step 226.
   i. If the size of the active set is below the maximum allowed, the UE first adds radio link to the active set as per step 208. Then the UE proceeds to the Serving HS-DSCH cell change procedure, which is executed according to the steps described above in sections 3i, 3ii and 3iii as shown in FIG. 2 with the same reference numerals as described previously except using the suffix "a". Finally, after execution of the step 222 wherein a positive determination is made that a combined RL removal and addition was ordered by the RNC, the UE removes the radio link from the AS as shown in a step 224 followed by a step 290 in which the UE notifies the RRC in the RNC that the ASU is completed. If it is determined in the step 222 that a combined RL removal and addition was not ordered, i.e., the RNC has merely ordered (in step 202) a radio link addition, the step 290 is executed directly, without executing step 224.
   ii. If the decision step 226 determines that the size of the active set is the maximum allowed, and if the RL, is determined in a step 228 by the Serving HS-DSCH radio link indicator IE, is already in the active set, the UE proceeds to the Serving HS-DSCH cell change procedure, which is executed according to the above described sections 3i, 3ii and 3iii. Finally UE removes and adds a radio link as shown in steps 224b, 208b and then step 290 is executed.
   iii. As shown in the steps below step 226 in FIG. 2 and to the right of decision step 228, if the size of the active set is the maximum allowed, and if the RL, determined in the step 228 by means of the Serving HS-DSCH radio link indicator IE, is not in the active set, UE removes and adds a radio link as shown in steps 224a, 208a. Then the UE proceeds to the Serving HS-DSCH cell change procedure, which is executed according similarly to the above described sections 3i, 3ii and 3iii as shown in the steps 210a, 212a, 214a, 216a, 218a, 220a and 222a.

5. In the case where the RNC has ordered the Radio link removal as shown being determined by the UE in a step 206, the UE proceeds to the Serving HS-DSCH cell change procedure beginning with a decision step 210c (similar to decision step 210) and then proceeds to execute a series of steps 212c, 214c, 216c, 218c, 270c which are executed in a manner similar to that already described in steps 212, 214, 216, 218, 220 in the sections 3i, 3ii and 3iii and in steps 212a, 214a, 216a, 218a, 220a in the sections 4i, 4ii and 4iii above. Finally, the UE removes the radio link as shown in a step 272.

6. At the conclusion of whichever one of the three parallel procedures shown in FIG. 2 is executed, the UE sends RRC: ACTIVE SET UPDATE COMPLETE message as shown in the step 290 corresponding to the message signal on the line 34 in FIG. 1.

FIG. 3 shows the functionality from the point of view of the RNC in case an RRC:MEASUREMENT REPORT message is received on the line 22 of FIG. 1 reporting event 1B or 1C, which leads to removal of the serving HS-DSCH cell from the active set, as shown in a step 302. See 3GPP TR 25-922 v 6.0.1 (2004-04) entitled "Radio Resource Management Strategies" for a description of events 1A, 1B and 1C. Either synchronized or unsynchronized procedures can be used. Radio links may be under control of either the Serving RNC or a Drift RNC.

Optionally the user plane transmission of the RBs mapped to HS-DSCH is stopped in the Iub frame protocol layer in the current serving HS-DSCH cell to minimize the amount of data in the BTS buffer prior to serving HS-DSCH cell change as shown in a step 304.

In case of event 1B the serving HS-DSCH cell is changed to the new cell with the RADIO LINK RECONFIGURATION NBAP-procedure as shown in a step 306.

In case of event 1C, as shown in a step 308, the new RL is setup with the RADIO LINK SETUP/RADIO LINK ADDITION NBAP-procedure. If the new RL in the new radio link set is also the new serving HS-DSCH cell the RADIO LINK SETUP NBAP-procedure is used to setup the new serving HS-DSCH cell. If the new serving HS-DSCH cell is some other RL, the RADIO LINK RECONFIGURATION NBAP-procedure is used to setup the new serving HS-DSCH cell.

RNC sends the ACTIVE SET UPDATE RRC-message on the line 32 shown in FIG. 1 including the new serving HS-DSCH cell related information as shown in a step 310 in FIG. 3.

RNC receives the ACTIVE SET UPDATE COMPLETE RRC-message on the line 34 in FIG. 1 from the UE as shown in step 312 in FIG. 3.

RNC deletes the removed RL (old serving HS-DSCH cell), with the RADIO LINK DELETION NBAP-procedure as shown in step 314.

The user plane transmission of the RBs mapped to HS-DSCH is started in the Iub frame protocol layer in the new serving HS-DSCH cell. Starting could be done for instance according to any one of the following three alternatives:

1) When frame protocol flow control has granted the permission and the L1 synchronization has been indicated to RNC with the NBAP:SYNCHRONIZATION INDICATION message as shown in a step 316.

2) Immediately when frame protocol flow control has granted the permission as shown in a step 318.

3) When frame protocol flow control has granted the permission and the defined period of time has elapsed as shown in a step 320.

Selection between different methods can be based on information:

If the new serving HS-DSCH cell is included in the existing Radio Link Set, or it is the new radio link which is setup with NBAP: RADIO LINK SETUP message.

If the BTS scheduler is aware of synchronization status of the RL.

The foregoing steps may be carried out in functional blocks in the RNC that are responsible for RRC and NBAP signaling. Illustrations of these functional entities may be found for example for the RNC RRC at TS 25.331 (Release 6) v.6.2.0: Chapter 4.2. RRC layer model, FIG. 4.2-2: UTRAN side RRC model (DS-MAP system), FIG. 4.2-3: UTRAN side RRC model (DS-41 System) NBAP: TS 25.430 (Release 6) v6.1.0: Chapter Iub Interface Protocol Structure, FIG. 7: Iub Interface Protocol Structure. Optionally, the functional block responsible for frame protocol is affected.

Figure 4:
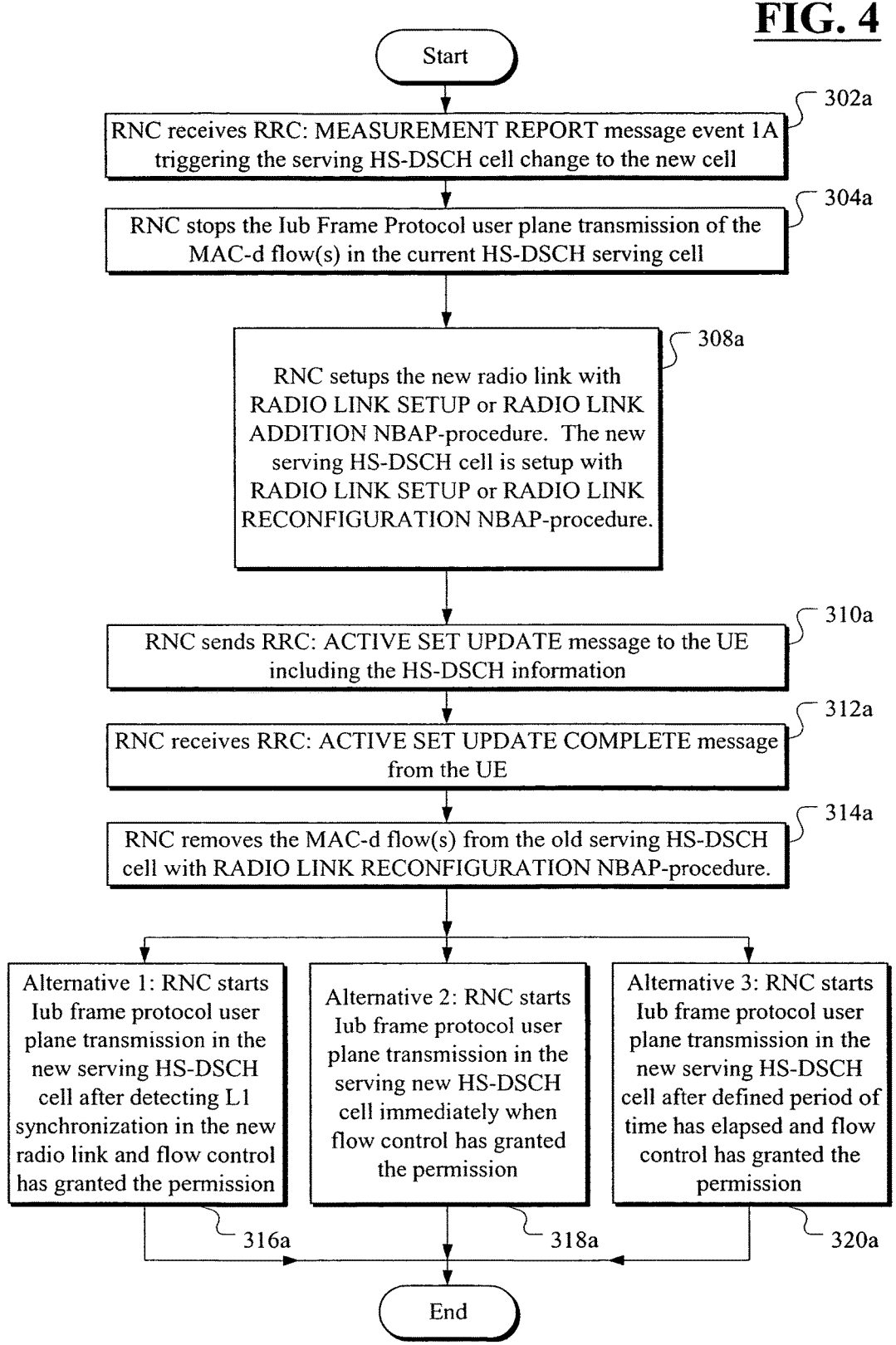
FIG. 4 shows the functionality in RNC in case of 1A event, which triggers the serving HS-DSCH cell change to the added cell in the active set, according to the present invention.

FIG. 4 shows the functionality in RNC in case of RRC: MEASUREMENT REPORT message is received indicative of event 1A, which triggers the serving HS-DSCH cell change to the added cell in the active set. Either synchronized or unsynchronized procedures can be used. Radio links may be under control of either Serving RNC or Drifting RNC. The functionality follows the functionality in FIG. 3 with similar steps numbered similarly except using the suffix "a" as in steps 302*a*, 304*a*, 308*a*, 310*a*, 312*a*, 314*a*, 316*a*, 318*a*, and 320*a*, but note that only the MAC-d flow(s) is (are) deleted, the RL is not deleted in the old serving HS-DSCH cell.

FIG. 5 shows a system which should be understood having a plurality of interconnected radio network controllers with associated Node B 500 and a plurality of user equipment 10, only one of each type being illustrated. The RNC/Node B interface (Iub) applies NBAP signaling protocol and an air-interface (Uu) lies between the NodeB and the UE. Each radio network controller comprises a receiver 502 for receiving at the radio network controller via Node B a measurement report on the line 22 of FIG. 1 from a user equipment and which processes the measurement report in order to put it in appropriate form for presentation to other functional modules within the RNC. Some of the steps carried out by the block 502 may for instance includes steps similar to steps 302, 304 or 302*a*, 304*a* of FIG. 3 or FIG. 4, respectively, in whole or in part. A decider 504 is responsive to the measurement report as processed by the receiver 502 for making a decision whether to make a serving high-speed downlink shared channel (HS-DSCH) cell change and whether to make an active set update. Such a decider can carry out its decision for instance in conjunction with steps 302, 304 or steps 302*a*, 304*a* and/or the steps 24, 26 of FIG. 1. Also included is a preparer 506 for preparing a radio link at a new cell to operate as a serving high-speed downlink shared channel radio link. Such a preparer may for instance carry out steps 306 or 308 of FIG. 3 or step 308 or of FIG. 4, or those described by the block 4 of FIG. 1. Once the preparer makes the above mentioned preparations it triggers a sender 508 for sending an active set update message 32 from the radio network controller via Node B to the user equipment as in the bloc 5 of FIG. 1, the active set update message including information about the high-speed downlink shared channel cell change (see step 310 or 310*a* of FIG. 3 or 4). Subsequently, the receiver 502 of the RNC 20 receives an active set update complete message 34 from the user equipment via Node B which triggers a starter 520 to start a frame protocol in the radio link of the new cell (see step 312 or 312*a*).

One of the plural user equipment 10 is also shown in detail. Each user equipment comprises a receiver 530 for receiving an active set update message 32 from a radio network controller 20 via Node B 500 with a radio link addition or removal to or from the active set, or both. See step 200 of FIG. 2A. A checker 532 checks the active set update message for information about a serving high-speed downlink shared channel (HS-DSCH) cell change, if any as shown for instance in steps 202, 204, 206 of FIG. 2. If such is present, a configuration module 534 configures the user equipment to operate with another or a new serving high-speed downlink shared channel cell as detailed for instance in the steps of FIG. 2. Once this is carried out, a module 536 for adding or removing, or both, a radio link to or from, or both, an active set, adds a link, removes a link, or does both. Then a sender 538 sends an active set update complete message 34 from the user equipment to the radio network controller via Node B as shown in step 290 of FIG. 2. As mentioned previously, the receiver 502 in the RNC then triggers the starter 520 to start the frame protocol in the radio link of the new cell.

It should be understood that some or all of the functional blocks shown in the RNC of FIG. 5 will typically be carried out as coded instructions, i.e., a computer program embodied in either a computer readable medium or in an integrated circuit with equivalent dedicated hardware or a combination thereof. For instance, an integrated circuit 550 may be utilized to carry out the functions of the decider 504 and the preparer 506 of the RNC 20 of FIG. 5. As such, the integrated circuit 550 may be viewed as means for carrying out the change to the new HS-DSCH cell within the RNC. Similarly, an integrated circuit 510 may be used in the user equipment 10 to carry out the functions of the adder and remover module 536, the configuration module 534 and the checker module 532. Such an integrated circuit 560 may be viewed as means for carrying out the change to the new HS-DSCH cell within the UE. It should also be understood that although the Node B and the UE are shown with a single antenna used by means of a duplexer for both sending and receiving over the air-interface, there could of course be separate sending and receiving antennas.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method, comprising:
communicating with a user equipment according to Fractional DPCH and with a signaling radio bearer mapped onto a high-speed downlink shared channel (HS-DSCH);
then receiving, by a network node, a measurement report from the user equipment;
making a decision, by the network node, based on the measurement report, to make a serving cell change from a current serving HS-DSCH cell to a new serving HS-DSCH cell and to make an active set update;
preparing, by the network node, a radio link at the new serving HS-DSCH cell to operate as a new serving HS-DSCH radio link for the user equipment;
stopping a user plane transmission with the user equipment over a current serving HS-DSCH radio link in the current serving HS-DSCH cell;
then sending, by the network node, an active set update message to the user equipment, said active set update message including an order and a cell change information, the order directing the user equipment to make one or more of the following modifications to an active set of a connection: radio link addition and radio link removal, and the cell change information comprising information indicating a new serving HS-DSCH radio link in the new serving HS-DSCH cell;
receiving, at the network node, an active set update complete message from the user equipment; and
starting, by the network node, a user plane transmission with the user equipment using the new serving HS-DSCH radio link in the new serving HS-DSCH cell, responsive to a combination of frame protocol flow control granting permission and either of L1 synchronization being indicated to the network node or elapse of a defined period of time.

2. The method of claim 1, wherein the steps of claim 1 are executed by an integrated circuit.

3. The method of claim 1, wherein the measurement report comprises an intra-frequency reporting event.

4. The method of claim 1, wherein the order in the active set update message directs the user equipment to remove a current serving HS-DSCH radio link at the current serving HS-DSCH cell.

5. The method of claim 1, wherein said cell change information further comprises a MAC-hs reset indicator to indicate that a MAC-hs entity needs to be reset.

6. The method of claim 1, wherein said cell change information further comprises a new HS-DSCH Radio Network Temporary Identifier (New H-RNTI).

7. The method of claim 1, wherein the communicating step comprises communicating a user plane transmission related to the signaling radio bearer mapped onto HS-DSCH, with the user equipment using the current serving HS-DSCH radio link at the current serving HS-DSCH cell;
and wherein the starting step starts a user plane transmission related to a signaling radio bearer mapped onto HS-DSCH, with the user equipment using the new serving HS-DSCH radio link in the new serving HS-DSCH cell.

8. An apparatus, comprising:
a receiver configured to receive a measurement report from a user equipment regarding communications with the user equipment according to Fractional DPCH and with a signaling radio bearer mapped onto a high-speed downlink shared channel (HS-DSCH);
a decider configured to decide, based on the measurement report, to make a serving cell change from a current serving HS-DSCH cell to a new serving HS-DSCH cell and to make an active set update;
a preparer configured to prepare a radio link at the new serving HS-DSCH cell to operate as a new serving HS-DSCH radio link for the user equipment; and
a sender configured to send an active set update message to the user equipment, said active set update message including an order and a cell change information, the order directing the user equipment to make one or more of the following modifications to an active set of a connection: radio link addition and radio link removal, and the cell change information comprising information indicating a new serving HS-DSCH radio link in the new serving HS-DSCH cell; and
a starter configured to start a user plane transmission with the user equipment using the new serving HS-DSCH radio link in the new serving HS-DSCH cell, responsive to a combination of frame protocol flow control granting permission and either of L1 synchronization being indicated or elapse of a defined period of time;
wherein said receiver is further configured to receive an active set update complete message from the user equipment;
and wherein said apparatus is configured to stop a user plane transmission with the user equipment over a current serving HS-DSCH radio link in the current serving HS-DSCH cell, prior to the sender sending the active set update message to the user equipment.

9. The apparatus of claim 8, wherein said cell change information further comprises a MAC-hs reset indicator.

10. The apparatus of claim 8, wherein said cell change information further comprises a new HS-DSCH Radio Network Temporary Identifier (New H-RNTI).

11. A non-transitory computer readable storage medium embedded with a computer program, comprising programming code for:

communicating with a user equipment according to Fractional DPCH and with a signaling radio bearer mapped onto a high-speed downlink shared channel (HS-DSCH);

then receiving a measurement report from the user equipment;

making a decision, based on the measurement report, to make a serving cell change from a current serving HS-DSCH cell to a new serving HS-DSCH cell and to make an active set update;

preparing a radio link at the new serving HS-DSCH cell to operate as a new serving HS-DSCH radio link for the user equipment;

stopping a user plane transmission with the user equipment using a current serving HS-DSCH radio link in the current serving HS-DSCH cell;

then sending an active set update message to the user equipment, said active set update message including an order and a cell change information, the order directing the user equipment to make one or more of the following modifications to an active set of a connection: radio link addition and radio link removal, and the cell change information comprising information indicating a new serving HS-DSCH radio link in the new serving HS-DSCH cell;

receiving an active set update complete message from the user equipment; and responsive to a combination of frame protocol flow control granting permission and either of L1 synchronization being indicated or elapse of a defined period of time, starting a user plane transmission with the user equipment using the new serving HS-DSCH radio link in the new serving HS-DSCH cell.

\* \* \* \* \*